United States Patent
Aragai et al.

(10) Patent No.: US 8,600,616 B2
(45) Date of Patent: Dec. 3, 2013

(54) IN-VEHICLE INSTRUMENT CONTROL DEVICE

(75) Inventors: Takashi Aragai, Kasugai (JP); Yusuke Ukai, Komaki (JP); Hirohito Miyazaki, Gifu (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 0 days.

(21) Appl. No.: 13/420,653

(22) Filed: Mar. 15, 2012

(65) Prior Publication Data

US 2012/0239249 A1    Sep. 20, 2012

(30) Foreign Application Priority Data

Mar. 15, 2011 (JP) ................................. 2011-056161

(51) Int. Cl.
*B60L 1/00* (2006.01)
(52) U.S. Cl.
USPC ........................................... 701/36; 307/10.1
(58) Field of Classification Search
USPC ........................................... 701/36; 307/10.1
See application file for complete search history.

(56) References Cited

U.S. PATENT DOCUMENTS

| 8,078,331 | B2 | 12/2011 | Sakane |
| 2004/0160319 | A1* | 8/2004 | Joao ........................... 340/539.1 |
| 2009/0082909 | A1 | 3/2009 | Sakane |
| 2010/0244560 | A1* | 9/2010 | Sato et al. .................... 307/10.1 |

FOREIGN PATENT DOCUMENTS

JP    2004-025938 A    1/2004

OTHER PUBLICATIONS

Patent Abstracts of Japan for Japanese Publication No. 2004-025938, publication date Jan. 29, 2004 (1 page).

* cited by examiner

*Primary Examiner* — Mary Cheung
*Assistant Examiner* — Yuen Wong
(74) *Attorney, Agent, or Firm* — Osha Liang LLP

(57) ABSTRACT

An in-vehicle instrument control device, that controls a power source of a plurality of in-vehicle instruments operated by power from the power source provided in a vehicle, includes a plurality of operation units to operate the respective in-vehicle instruments; and a plurality of power source control units that are each provided between the operation unit and the power source, and the in-vehicle instrument, and each supply the power from the power source to the in-vehicle instrument when a predetermined operation signal is inputted from the operation unit.

2 Claims, 9 Drawing Sheets

IN-VEHICLE INSTRUMENT CONTROL DEVICE

BACKGROUND OF THE INVENTION

1. Technical Field

The present invention relates to an in-vehicle instrument control device, and particularly to an in-vehicle instrument control device that controls a power source of a plurality of in-vehicle instruments.

2. Related Art

Conventionally, control of a power source of in-vehicle instruments provided in a vehicle has been performed by operating an ignition switch or a power switch that collectively switches a state of the power source of the respective in-vehicle instruments. For example, when the ignition switch is set to OFF, the power source of almost all the in-vehicle instruments is turned off, and when the ignition switch is set to ACC, the power source of a part of the in-vehicle instruments is turned on, and when the ignition switch is set to ON, the power source of almost all the in-vehicle instruments is turned on.

Accordingly, for example, when a car stereo device, a car navigation device, or the like is used, in order to supply power to those in-vehicle instruments, the ignition switch needs to be set to ACC or ON. As a result, the power source of the in-vehicle instruments that are not used is also turned on, thereby causing wasteful power consumption.

Moreover, conventionally, there has been proposed a technique in which a connection switch is interposed between a navigation ECU and an air-bag ECU, and a battery, and when code verification by an ID code sent from an electronic key succeeds, the relevant connection switch is turned on to supply the power to the navigation ECU and the air-bag ECU (e.g., refer to Japanese Unexamined Patent Publication No. 2004-25938).

Accordingly, even though the ignition switch or the power switch is not operated, the supply of the power to the navigation ECU and the air-bag ECU is started almost at the same time as unlocking of a door lock of the vehicle using the electronic key, which can bring about a usable state.

However, in this case, after the code authentication has succeeded, the power continues to be constantly supplied to the navigation ECU and the air-bag ECU. This will cause power consumption even when a user does not use the navigation ECU.

SUMMARY

One or more embodiments of the present invention enable a power source of a plurality of in-vehicle instruments to be individually controlled, and power consumption of the in-vehicle instruments whose predetermined operation is not performed to be reduced.

An in-vehicle instrument control device according to one or more embodiments of the present invention is an in-vehicle instrument control device that controls a power source of a plurality of in-vehicle instruments operated by power from the power source provided in a vehicle, the device including a plurality of operation units to operate the respective in-vehicle instruments, and a plurality of power source control units that are each provided between the operation unit and the power source, and the in-vehicle instrument, and each supply the power from the power source to the in-vehicle instrument when a predetermined operation signal is inputted from the operation unit.

In the in-vehicle instrument control device according to one or more embodiments of the present invention, when the predetermined operation signal is inputted from one of the operation units, the power from the power source is supplied to the in-vehicle instrument corresponding to the relevant operation unit.

Accordingly, the power source of the plurality of in-vehicle instruments can be individually controlled, and power consumption of the in-vehicle instruments whose predetermined operation is not performed can be reduced.

This power source is made of, for example, a battery. This vehicle is made of, for example, an engine vehicle, an EV (Electric Vehicle), an HEV (Hybrid Electric Vehicle), a PHEV (Plug-in Hybrid Electric Vehicle) or the like. This operation unit is made up of, for example, switches, buttons, a touch panel, and the like. This power source control unit is made of, for example, an electric circuit.

In this in-vehicle instrument control device, there can be further provided a user authentication request unit that requests a user authentication result to a user authentication unit, and an in-vehicle instrument control unit that determines whether or not power supply from the power source to the in-vehicle instrument is permitted for the request from the user authentication request unit, based on the received user authentication result, and notifies the power source control unit of a determination result, wherein after the supply of the power is started, the power source control unit can request the determination to the in-vehicle instrument control unit, and when the supply of the power is permitted by the in-vehicle instrument control unit, the power source control unit can supply the power from the power source.

This can prevent a person other than a predetermined user from using the in-vehicle instruments without permission. Moreover, because the in-vehicle instruments do not operate unless the user authentication succeeds, the power consumption of the in-vehicle instruments that are not used whose predetermined operation is not performed can be reduced.

These user authentication request unit and in-vehicle instrument control unit are each made of an arithmetic operation device such as, for example, a CPU (Central Processing Unit), an MPU (Micro Processing Unit), an ECU (Electronic Control Unit), and the like.

In this in-vehicle instrument control device, there can be further provided a user authentication request unit that requests a user authentication result to a user authentication unit, wherein after the supply of the power from the power source control unit is started, the in-vehicle instrument can request the user authentication result to the user authentication unit, and upon receiving the user authentication result indicating that the user authentication has succeeded, the in-vehicle instrument can have the power supplied from the power source.

This can prevent a person other than a predetermined user from using the in-vehicle instruments without permission. Moreover, because the in-vehicle instruments do not operate unless the user authentication succeeds, the power consumption of the in-vehicle instruments when the user authentication does not succeed can be reduced.

This user authentication request unit is made of an arithmetic operation device such as, for example, a CPU (Central Processing Unit), an MPU (Micro Processing Unit), an ECU (Electronic Control Unit), and the like After the supply of the power to the in-vehicle instrument is started, the power source control unit can stop the supply of the power to the in-vehicle instrument, based on the control of the in-vehicle instrument.

This enables the in-vehicle instruments to stop the supply of the power to themselves, for example, if the user authentication has failed, which can reduce the power consumption.

According to one or more embodiments of the present invention, the power source of the plurality of in-vehicle instruments can be individually controlled, and power consumption of the in-vehicle instruments whose predetermined operation is not performed can be reduced.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration Example of In-Vehicle System 11]

Figure 1:
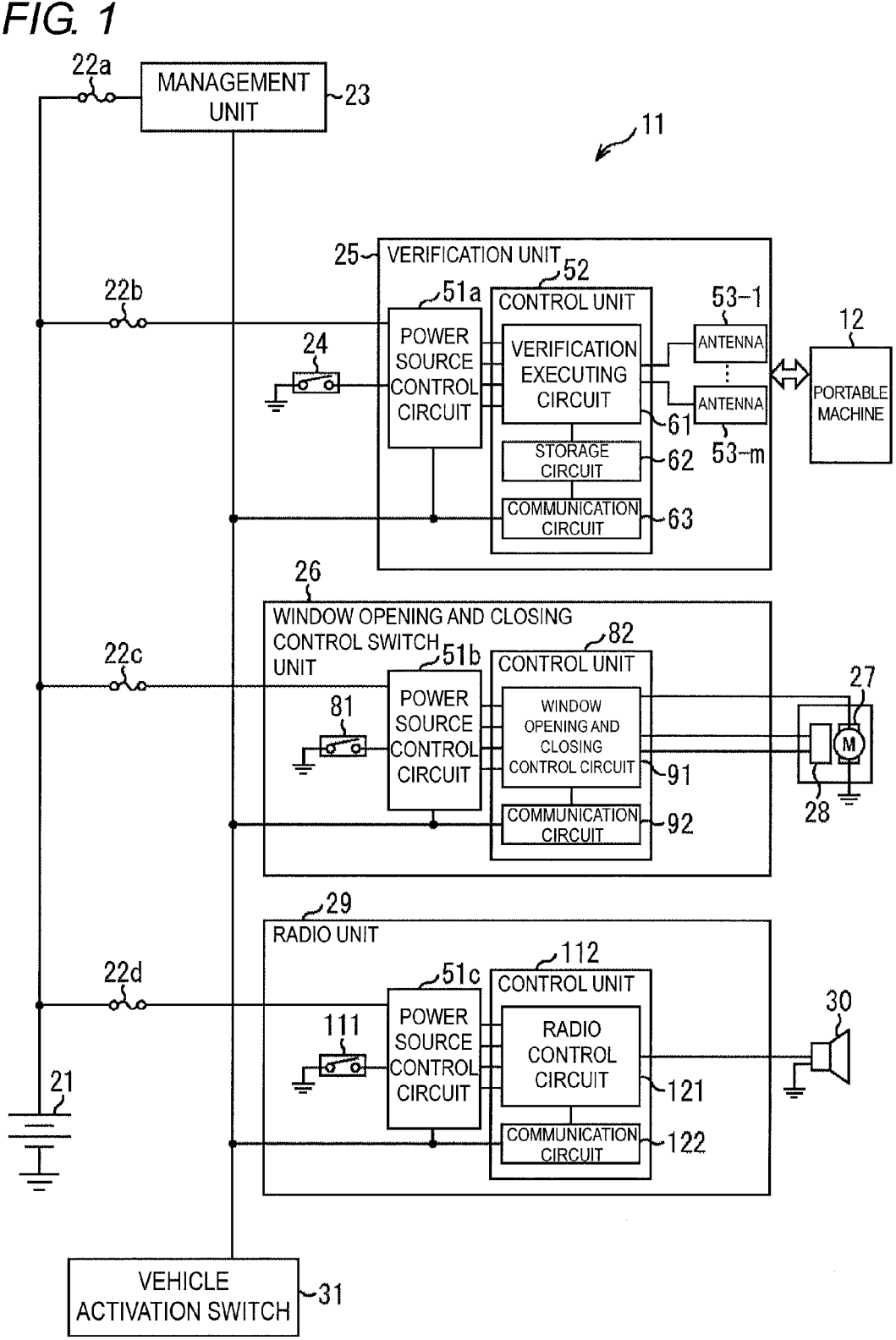
FIG. 1 is a block diagram in accordance with one or more embodiments of the present invention of a part of an in-vehicle system to which the present invention is applied.

FIG. 1 is a block diagram according to one or more embodiments of a part of an in-vehicle system.

The in-vehicle system 11 is a system provided in various vehicles. A type of a vehicle provided with the power management system 11 is not particularly limited, and for example, an engine vehicle, an EV (Electric Vehicle), an HEV (Hybrid Electric Vehicle), a PHEV (Plug-in Hybrid Electric Vehicle), and the like are covered.

The in-vehicle system 11 includes a battery 21, fuses 22a to 22d, a management unit 23, a door request switch 24, a verification unit 25, a window opening and closing control switch unit 26, a power window motor 27, a window position sensor 28, a radio unit 29, a speaker 30, and a vehicle activation switch 31.

The management unit 23, the verification unit 25, the window opening and closing control switch unit 26, the radio unit 29 and the vehicle activation switch 31 are connected through communication lines to communicate with one another, based on a predetermined communication method (e.g., CAN (Controller Area Network) or the like).

The battery 21 is connected to the management unit 23, the verification unit 25, the window opening and closing control switch unit 26, and the radio unit 29 through the fuses 22a to 22d to supply the power to the respective units.

The management unit 23 requests execution of user authentication to the verification unit 25 to receive a result thereof. Moreover, the management unit 23 determines whether or not the power supply from the power source to the unit as a request source is permitted, based on the result of the user authentication for a request from the window opening and closing control switch unit 26 or the radio unit 29. The management unit 23 notifies the unit as the request source of a determination result, by which the power source of the unit as the request source is controlled.

The door request switch 24 is a switch to unlock a door (not shown) of the vehicle, for which an arbitrary type of switch can be used.

The verification unit 25 is a unit that performs the user authentication to permit the unlocking of the door lock of the vehicle, the use of the in-vehicle instruments, the operation of the vehicle activation switch 31, the driving of the vehicle, and the like by communicating with a portable machine 12 possessed by a user.

The verification unit 25 includes a power source control circuit 51a, a control unit 52, and antennas 53-1 to 53-m.

The power source control circuit 51a is a circuit provided between the door request switch 24 and the battery 21, and a verification executing circuit 61 of the control unit 52 to control the supply of the power from the battery 21 to the verification executing circuit 61. The power source control circuit 51a is supplied with the power from the battery 21. When the door request switch 24 is turned on, or when a predetermined signal is inputted from outside through the communication line, the power source control circuit 51a supplies the power from the battery 21 to the verification executing circuit 61. Moreover, the power source control circuit 51a stops the supply of the power to the verification executing circuit 61, based on the control of the verification executing circuit 61.

Moreover, the power source control circuit 51a notifies the verification executing circuit 61 of a signal indicating a state of the door request switch 24.

The control unit 52 includes the verification executing circuit 61, a storage circuit 62, and a communication circuit 63.

The verification executing circuit 61 communicates with the portable machine 12 through the antennas 53-1 to 53-m to read an identification number from the portable machine 12 and perform matching between the read identification number and an identification number stored in advance. Moreover, the verification executing circuit 61 performs determination as to whether the portable machine 12 is in a vehicle interior or in a vehicle exterior (hereinafter, referred to as interior/exterior determination), based on the antennas 53-1 to 53-m used for the communication with the portable machine 12. The verification executing unit 61 then performs the user authentication, based on a matching result and a result of the interior/exterior determination. The verification executing unit 61 then notifies the management unit 23 and the like of the result of the user authentication through the communication circuit 63.

The storage unit 62 is made of a storage device such as, for example, an EEPROM (Electrically Erasable Programmable Read-Only Memory) and the like. The storage circuit 62 stores programs and data necessary for processing of the verification executing circuit 61.

The communication circuit 63 communicates with various devices in the vehicle such as the management unit 23, the window opening and closing control switch unit 26, the radio unit 29, and the like, based on a predetermined communication method (e.g., CAN or the like). The communication circuit 63 receives signals from the other devices to supply to the verification executing circuit 61, or transmits a signal supplied from the verification executing circuit 61 to the other devices.

The antennas 53-1 to 53-m are installed at predetermined positions of the vehicle, respectively to transmit and receive an electromagnetic wave between the portable machine 12 and themselves in predetermined communication areas. The communication areas of a part of the antennas 53-1 to 53-m are set in the vehicle interior, and the remaining communication areas are set in the vehicle exterior.

Hereinafter, when the antennas 53-1 to 53-m need not be distinguished individually, each of the antennas is simply referred to as an antenna 53.

The window opening and closing control switch unit 26 is a unit that controls the opening and closing of windows (not shown) of the vehicle by controlling the power window motor 27, based on positions of the windows detected by the window position sensor 28.

The window opening and closing control switch unit 26 includes a power source control circuit 51b, a window opening and closing switch 81, and a control unit 82.

The power source control circuit 51b has a similar circuit configuration to the power source control circuit 51a of the verification unit 25. The power source control circuit 51b is provided between the window opening and closing switch 81 and the battery 21, and a window opening and closing control circuit 91 of the control unit 82 to control the supply of the power from the battery 21 to the control unit 82. Specifically, when the window opening and closing switch 81 is turned on, or when a predetermined signal is inputted from outside through the communication line, the power source control circuit 51b is activated to supply the power from the battery 21 to the control unit 82. Moreover, the power source control circuit 51b stops the supply of the power to the control unit 82, based on the control of the window opening and closing control circuit 91.

Moreover, the power source control circuit 51b notifies the window opening and closing control circuit 91 of a signal indicating a state of the window opening and closing switch 81.

The window opening and closing switch 81 is a switch to open and close the windows of the vehicle, for which an arbitrary type of switch can be used. For example, different switches can be used when the widows are opened and when the windows are closed, or a multi-contact switch can be used.

The control unit 82 includes the window opening and closing control circuit 91 and a communication circuit 92.

The window opening and closing control circuit 91 controls the opening and closing of the windows of the vehicle by controlling the power window motor 27, based on a signal notified from the power source control circuit 51b by operating the window opening and closing switch 81 and the position of each of the windows detected by the window position sensor 28. Before controlling the opening and closing of the window, the window opening and closing control circuit 91 communicates with the management unit 23 through the communication circuit 92, and when the power source control is permitted by the management unit 23, the power source control by the power source control circuit 51b is executed.

The communication circuit 92 performs the communication based on a predetermined communication method (e.g., CAN or the like) with the various devices in the vehicle such as the management unit 23, the verification unit 25, the radio unit 29, and the like. The communication circuit 92 receives signals transmitted from the other devices to notify the window opening and closing control circuit 91, or transmits a signal notified from the window opening and closing control circuit 91 to the other devices.

The radio unit 29 is a unit that executes a radio function. That is, the radio unit 29 receives a radio wave transmitted from a radio station to supply an audio signal based on the received radio wave to the speaker 30 and output sounds from the speaker 30.

The radio unit 29 includes a power source control circuit 51c, a radio power switch 111, and a control unit 112.

The power source control circuit 51c has a similar circuit configuration to the power source control circuit 51a of the verification unit 25 and the power source control circuit 51b of the window opening and closing control switch unit 26. The power source control circuit 51c is provided between the radio power switch 111 and the battery 21, and a radio control circuit 121 of the control unit 112 to control the supply of the power from the battery 21 to the radio control circuit 121. Specifically, when the radio power switch 111 is turned on, or when a predetermined signal is inputted from outside through the communication line, the power source control circuit 51c is activated to supply the power from the battery 21 to the radio control circuit 121. Moreover, the power source control circuit 51c stops the supply of the power to the radio control circuit 121, based on the control of the radio control circuit 121.

Moreover, the power source control circuit 51c notifies the radio control circuit 121 of a signal indicating a state of the radio power switch 111.

The radio power switch 111 is a switch to turn on or off the power of the radio unit 29, for which an arbitrary type of switch can be used.

The control unit 112 includes the radio control circuit 121 and a communication circuit 122.

The radio control circuit 121 is a circuit that executes the radio function in accordance with a signal supplied from the power source control circuit 51c by operating the radio power switch 111. Before executing the radio function, the radio control circuit 121 communicates with the management unit 23 through the communication circuit 122, and when the power source control is permitted by the management unit 23, the power source control by the power source control circuit 51c is executed.

The communication circuit 122 performs the communication based on a predetermined communication method (e.g., CAN or the like) with the various devices in the vehicle such as the management unit 23, the verification unit 25, the window opening and closing control switch unit 26, and the like. The communication circuit 122 receives signals transmitted from the other devices to notify the radio control circuit 121, or transmits a signal notified from the radio control circuit 121 to the other devices.

The vehicle activation switch 31 is a switch to switch a state of the power source of the vehicle, or start up the vehicle, and is made of, for example, an ignition switch or a power switch.

The vehicle activation switch 31 notifies the various devices in the vehicle such as the management unit 23 and the like of a signal of its own state (setting position).

Hereinafter, the vehicle activation switch 31 can be set to four positions of OFF to turn off the power source of almost all the in-vehicle instruments, ACC to turn on the power source of a part of the in-vehicle instruments, ON to turn on the power source of almost all the in-vehicle instruments, and START to start up an engine or a motor. Moreover, it is not until user authentication described later has succeeded that the vehicle activation switch 31 can be set to the states other than OFF.

Hereinafter, when the power source control circuits 51a to 51c need not be distinguished individually, each of the power source control circuits is simply referred to as a power source control circuit 51.

[Configuration Example of Power Source Control Circuit 51]

Figure 2:
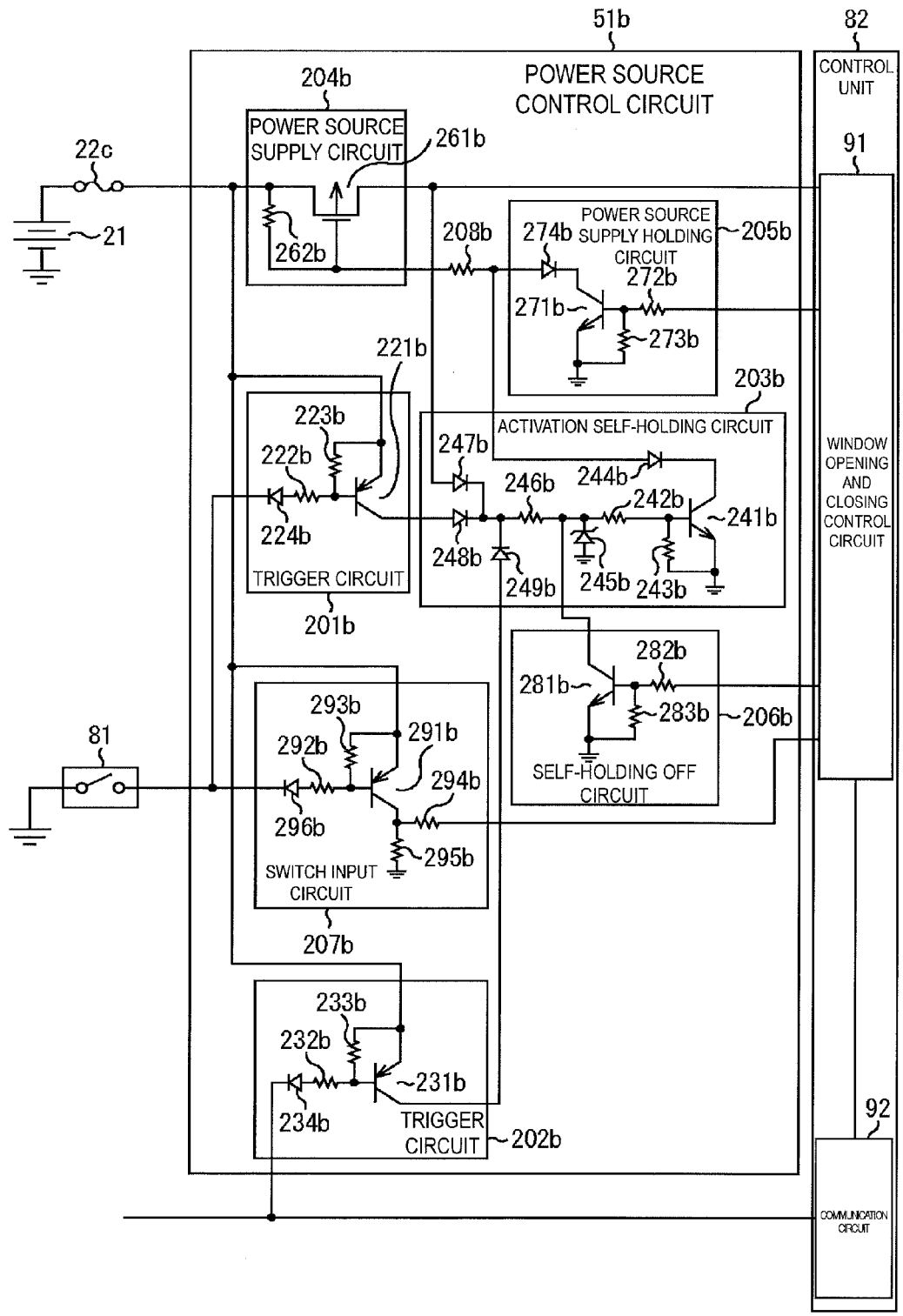
FIG. 2 is a circuit diagram showing a configuration example of a power source control circuit.

Next, referring to FIG. 2, a configuration example of the power source control circuit 51 will be described. In FIG. 2, the power source control circuit 51b and a periphery thereof are shown among the power source control circuits 51a to 51c.

The power source control circuit 51b includes a trigger circuit 201b, a trigger circuit 202b, an activation self-holding circuit 203b, a power source supply circuit 204b, a power source supply holding circuit 205b, a self-holding off circuit 206b, a switch input circuit 207b, and a resistance 208b.

The trigger circuit 201b includes a PNP type transistor 221b, a resistance 222b, a resistance 223b, and a diode 224b.

An emitter of the transistor 221b is connected to a positive electrode of the battery 21 through the fuse 22c, a base thereof is connected to an anode of the diode 224b through the resistance 222b, and a collector thereof is connected to an anode of a diode 248b of the activation self-holding circuit 203b. The resistance 223b is connected between the base and the emitter of the transistor 221b. A cathode of the diode 224b is connected to one end of the window opening and closing switch 81, which is different from grounded one end.

The trigger circuit 202b includes a PNP type transistor 231b, a resistance 232b, a resistance 233b, and a diode 234b.

An emitter of the transistor 231b is connected to the positive electrode of the battery 21 through the fuse 22c, a base thereof is connected to an anode of the diode 234b through the resistance 232b, and a collector thereof is connected to an anode of a diode 249b of the activation self-holding circuit 203b. The resistance 233b is connected between the base and the emitter of the transistor 231b. A cathode of the diode 234b is connected to the management unit 23 and the communication circuit 92 of the control unit 82 through the communication line.

The activation self-holding circuit 203b includes an NPN type transistor 241b, a resistance 242b, a resistance 243b, a diode 244b, a Zener diode 245b, a resistance 246b, and diodes 247b to 249b.

An emitter of the transistor 241b is grounded, a base thereof is connected to a cathode of the Zener diode 245b through the resistance 242b, and a collector thereof is connected to a cathode of the diode 244b. The resistance 243b is connected between the emitter and the collector of the transistor 241b. An anode of the diode 244b is connected to one end of a resistance 208b and a cathode of a diode 274b of the power source supply holding circuit 205b. An anode of the Zener diode 245b is grounded. One end of the resistance 246b is connected to a cathode of the Zener diode 245b, and the other end thereof is connected to cathodes of the diodes 247b to 249b. An anode of the diode 247b is connected to a drain of a MOSFET 261b of the power source supply circuit 204b, and the window opening and closing control circuit 91.

The power source supply circuit 204b includes the MOSFET 261b and a resistance 262b.

A source of the MOSFET 261b is connected to the positive electrode of the battery 21 through the fuse 22c, a gate thereof is connected to one end of the resistance 208b, which is one end different from one end connected to the diode 244b, and the drain thereof is connected to the window opening and closing control circuit 91. The resistance 262b is connected between the gate and the source of the MOSFET 261b.

The power source supply holding circuit 205b includes an NPN type transistor 271b, a resistance 272b, a resistance 273b, and the diode 274b.

An emitter of the transistor 271b is grounded, a base thereof is connected to the window opening and closing control circuit 91 through the resistance 272b, and a collector thereof is connected to a cathode of the diode 274b. The resistance 273b is connected between the base and the emitter of the transistor 271b.

The self-holding off circuit 206b includes an NPN type transistor 281b, a resistance 282b, and a resistance 283b.

An emitter of the transistor 281b is grounded, a base thereof is connected to the window opening and closing control circuit 91 through the resistance 282b, and a collector thereof is connected to the cathode of the Zener diode 245b of the activation self-holding circuit 203b. The resistance 283b is connected between the base and the emitter of the transistor 281b.

The switch input circuit 207b includes a PNP type transistor 291b, resistances 292b to 295b, and a diode 296b.

An emitter of the transistor 291b is connected to the positive electrode of the battery 21 through the fuse 22c, a base thereof is connected to an anode of the diode 296b through the resistance 292b, and a collector thereof is connected to the window opening and closing control circuit 91 through the resistance 294b and is grounded through the resistance 295b. The resistance 293b is connected between the base and the emitter of the transistor 291b. A cathode of the diode 296b is connected to the one end of the window opening and closing switch 81, which is different from the grounded one end.

Here, operation of the power source control circuit 51b will be described briefly.

First, operation when the supply of the power from the battery 21 to the control unit 82 is started will be described.

There are two methods for starting the supply of the power from the battery 21 to the control unit 82.

The first method is a method of operating the window opening and closing switch 81.

When the window opening and closing switch 81 is operated, the transistor 221b of the trigger circuit 201b is turned on. When the transistor 221b of the trigger circuit 201b is turned on, the transistor 241b of the activation self-holding circuit 203b is turned on, and further, the MOSFET 261b of the power source supply circuit 204b is turned on. When the MOSFET 261b of the power source supply circuit 204b is turned on, the supply of the power to the control unit 82 is started through the fuse 22c and the MOSFET 261b from the battery 21 to activate the window opening and closing control circuit 91 and the communication circuit 92.

Turning on the MOSFET 261b of the power source supply circuit 204b allows ON of the transistor 241b of the activation self-holding circuit 203b to be continued even when the operation of the window opening and closing switch 81 is completed, so that ON of the MOSFET 261b is continued. Accordingly, even when the operation of the window opening and closing switch 81 is completed, the supply of the power to the control unit 82 is continued.

After being activated, the window opening and closing control circuit 91 supplies a predetermined base current to the transistor 271b of the power source supply holding circuit 205b to turn on the transistor 271b. This allows ON of the MOSFET 261b to be continued even when the transistor 241b of the activation self-holding circuit 203b is turned off, and as a result, the supply of the power to the control unit 82 is continued.

When the window opening and closing switch 81 is operated, the transistor 291b of the switch input circuit 207b is turned on, while when the operation of the window opening and closing switch 81 is completed, the transistor 291*b* is turned off. When the transistor 291*b* is turned on, a signal at a predetermined voltage level (H level) is supplied from the switch input circuit 207*b* to the window opening and closing control circuit 91, while when the transistor 291*b* is turned off, a signal at a ground level (L level) is supplied from the switch input circuit 207*b* to the window opening and closing control circuit 91. This enables the window opening and closing control circuit 91 to detect an operation state such as ON/OFF of the window opening and closing switch 81.

The second method is a method of notifying the base of the transistor 231*b* of the trigger circuit 202*b* of a signal at a predetermined level from outside (from the management unit 23) through the communication line to turn on the transistor 231*b*.

When the transistor 231*b* of the trigger circuit 202*b* is turned on, the transistor 241*b* of the activation self-holding circuit 203*b* is turned on, and further the MOSFET 261*b* of the power source supply circuit 204*b* is turned on. The subsequent operation is similar to that when the window opening and closing switch 81 is operated.

Next, the operation when the supply of the power from the battery 21 to the control unit 82 is stopped will be described.

First, the window opening and closing control circuit 91 supplies a predetermined base current to the transistor 281*b* of the self-holding off circuit 206*b* to turn on the transistor 281*b*. This turns off the transistor 241*b* of the activation self-holding circuit 203*b*. At this time, because the transistor 271*b* of the power source supply holding circuit 205*b* remains on, the MOSFET 261*b* of the power source supply circuit 204*b* remains on, and the supply of the power from the battery 21 to the control unit 82 is continued.

Next, the window opening and closing control circuit 91 stops the supply of the base current of the transistor 271*b* of the power source supply holding circuit 205*b* to turn off the transistor 271*b*. This turns off the MOSFET 261*b* of the power source supply circuit 204*b* to stop the supply of the power from the battery 21 to the control unit 82.

At the start of the supply of the power from the battery 21 to the control unit 82, after the transistor 271*b* of the power source supply holding circuit 205*b* is turned on, the transistor 281*b* of the self-holding off circuit 206*b* may be turned on, and the transistor 241*b* of the activation self-holding circuit 203*b* may be turned off.

In the verification unit 25, the window opening and closing switch 81 in FIG. 2 is replaced by the door request switch 24, the window opening and closing control circuit 91 in the same figure is replaced by the verification executing circuit 61, and the communication circuit 92 in the same figure is replaced by the communication circuit 63.

In the radio unit 29, the window opening and closing switch 81 in FIG. 2 is replaced by the radio power switch 111, the window opening and closing control circuit 91 in the same figure is replaced by the radio control circuit 121, and the communication circuit 92 in the same figure is replaced by the communication circuit 122.

Reference numerals of respective units of the power source control circuit 51*a* of the verification unit 25 are represented by replacing "b" at a tail end of each of the reference numerals of the respective units of the power source control circuit 51*b* of the window opening and closing control switch unit 26 in FIG. 2 by "a". Similarly, hereinafter, reference numerals of respective units of the power source control circuit 51*c* of the radio unit 29 are represented by replacing "b" at the tail end of each of the reference numerals of the respective units of the power source control circuit 51*b* of the window opening and closing control switch unit 26 in FIG. 2 by "c".

While in FIG. 2, an example of the circuit configuration when the number of the switches is one is shown, when the number of the switches is two or more, for example, it is considered that the number of the trigger circuits 201*b* and the switch input circuit 207*b* is increased to the number of the switches, or that the respective switches are connected to the trigger circuit 201*b* and the switch input circuit 207*b* in parallel.

[Configuration Example of Management Unit 23]

Figure 3:
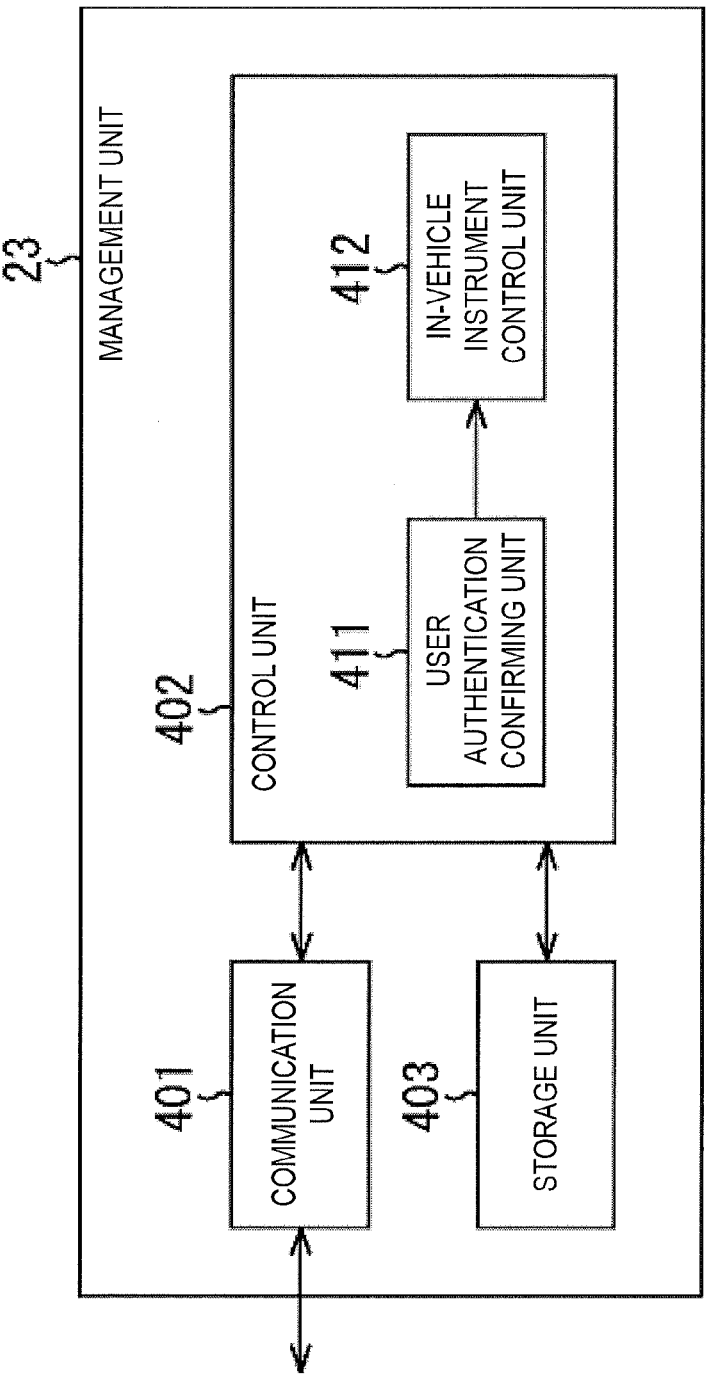
FIG. 3 is a block diagram showing a configuration example of a management unit.

FIG. 3 is a block diagram showing a configuration example of the management unit 23.

The management unit 23 includes a communication unit 401, a control unit 402, and a storage unit 403.

The communication unit 401 is made of various communication devices or communication circuits. The communication unit 401 performs the communication based on a predetermined communication method (e.g., CAN or the like) with the various devices in the vehicle such as the verification unit 25, the window opening and closing control switch unit 26, the radio unit 29, and the vehicle activation switch 31 and the like. The communication unit 401 receives signals transmitted from the other devices to notify the control unit 402, or transmits a signal notified from the control unit 402 to the other devices.

The control unit 402 is made of a processor such as, for example, a CPU (Central Processing Unit) an MPU (Micro Processing Unit), an ECU (Electronic Control Unit), and the like to control processing of the management unit 23. The control unit 402 executes a predetermined control program to thereby realize functions including a user authentication confirming unit 411 and an in-vehicle instrument control unit 412. Furthermore, the control unit 402 receives an operation result of the vehicle activation switch 31 and stores the same in the storage unit 403. When the control unit 402 receives the activation operation result of the vehicle activation switch 31, and receives the success of the user authentication from the verification unit 25, the control unit 402 stores the activation of the vehicle as activation state information of the vehicle in the storage unit 403.

The user authentication confirming unit 411 communicates with the verification unit 25 through the communication unit 401 to request a user authentication result to the verification unit 25. The user authentication confirming unit 411 receives the user authentication result from the verification unit 25. The control unit 402 receives a signal indicating the state of the vehicle activation switch 31 through the communication unit 401. The user authentication confirming unit 411 confirms user authentication determination, based on the user authentication result by the verification unit 25 or the state of the vehicle activation switch 31 to notify the in-vehicle instrument control unit 412 of a determination result.

The in-vehicle instrument control unit 412 communicates with the window opening and closing control switch unit 26 and the radio unit 29 through the communication unit 401. The in-vehicle instrument control unit 412 determines whether or not the power source control of the unit as a request source is permitted, based on the user authentication result in accordance with a request from the window opening and closing control switch unit 26 or the radio unit 29. The management unit 23 notifies the unit as the request source of the determination result through the communication unit 401 to thereby control the power source of the unit as the request source.

The storage unit 403 is made of a storage device such as, for example, an EEPROM and the like. The storage unit 403 stores programs and data necessary for the processing of the control unit 402.

[Functional Configuration Example of Window Opening and Closing Control Circuit 91]

Figure 4:
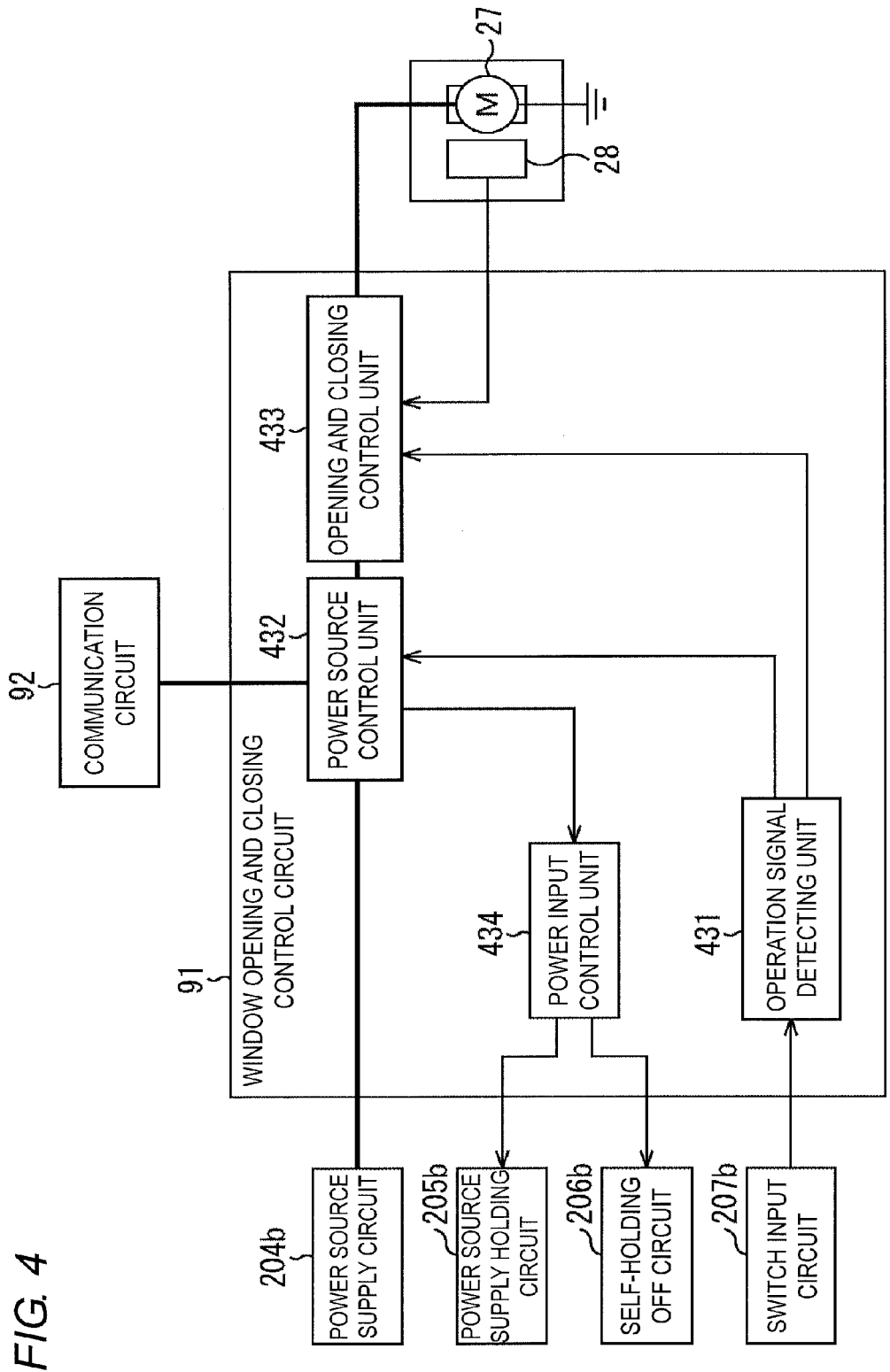
FIG. 4 is a block diagram showing a configuration example of a window opening and closing control circuit.

FIG. 4 is a block diagram showing a functional configuration example of the window opening and closing control circuit 91. The window opening and closing control circuit 91 includes an operation signal detecting unit 431, a power source control unit 432, an opening and closing control unit 433, and a power input control unit 434.

The operation signal detecting unit 431 detects the operation state to the window opening and closing switch 81, based on a signal notified from the switch input circuit 207*b* of the power source control circuit 51*b*, and notifies the power source control unit 432 and the opening and closing control unit 433 of a detection result.

The power source control unit 432 controls the supply of the power to the communication circuit 92. Moreover, the power source control unit 432 communicates with the management unit 23 through the communication circuit 92 to confirm whether or not the power supply from the power source to the power window motor 27 is permitted. The power source control unit 432 controls the supply of the power to the opening and closing control unit 433, based on the determination result of whether or not the power supply from the power source to the power window motor 27 is permitted by the management unit 23, and the detection result of the operation to the window opening and closing switch 81. Moreover, the power source control unit 432 controls the power input control unit 434 to thereby control the supply of the power from the power source supply circuit 204*b*.

The opening and closing control unit 433 controls the power window motor 27, based on the position of the window detected by the window position sensor 28 and the detection result of the operation to the window opening and closing switch 81 to thereby control the opening and closing of the window of the vehicle.

The power input control unit 434 controls the power source supply holding circuit 205*b* and the self-holding off circuit 206*b*, based on the control of the power source control unit 432 to control the supply of the power from the power source supply circuit 204*b* to the window opening and closing control circuit 91.

[Functional Configuration Example of Radio Control Circuit 121]

Figure 5:
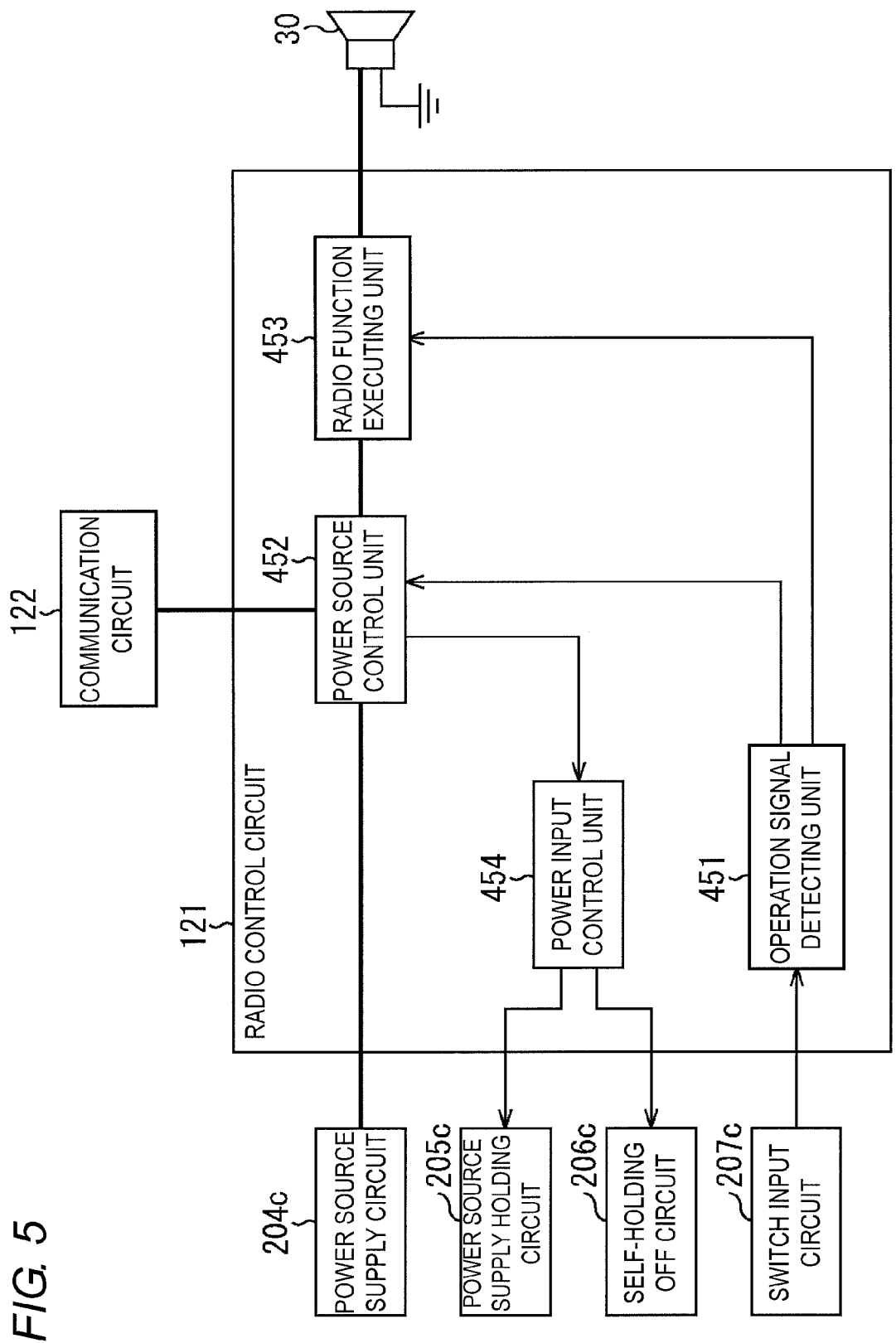
FIG. 5 is a block diagram showing a configuration example of a radio control circuit.

FIG. 5 is a block diagram showing a functional configuration example of the radio control circuit 121. The radio control circuit 121 includes an operation signal detecting unit 451, a power source control unit 452, a radio function executing unit 453, and a power input control unit 454.

The operation signal detecting unit 451 detects the operation to the radio power switch 111, based on a signal notified from the switch input circuit 207*c* of the power source control circuit 51*c*, and notifies the power source control unit 452 and the radio function executing unit 453 of a detection result.

The power source control unit 452 controls the supply of the power to the communication circuit 122. Moreover, the power source control unit 452 communicates with the management unit 23 through the communication circuit 122 to confirm whether or not the power supply from the power source to the radio function executing unit 453 is permitted. The power source control unit 452 controls the supply of the power to the radio function executing unit 453, based on a determination result of whether or not the power supply from the power source to the radio function executing unit 453 is permitted by the management unit 23, and the detection result of the operation to the radio power switch 111. Moreover, the power source control unit 452 controls the power input control unit 454 to thereby control the supply of the power from the power source supply circuit 204*c*.

The radio function executing unit 453 supplies the audio signal based on the radio wave received from the radio station to the speaker 30, based on the detection result of the operation to the radio power switch 111 to cause the sounds to be outputted from the speaker 30.

The power input control unit 454 controls the power source supply holding circuit 205*c* and the self-holding off circuit 206*c*, based on the control of the power source control unit 452 to control the supply of the power from the power source supply circuit 204*c* to the radio control circuit 121.

[Processing of In-Vehicle System 11]

Next, referring to FIGS. 6 to 9, processing of the in-vehicle system 11 will be described.

[Processing of Window Opening and Closing Control Switch Unit 26]

Figure 6:
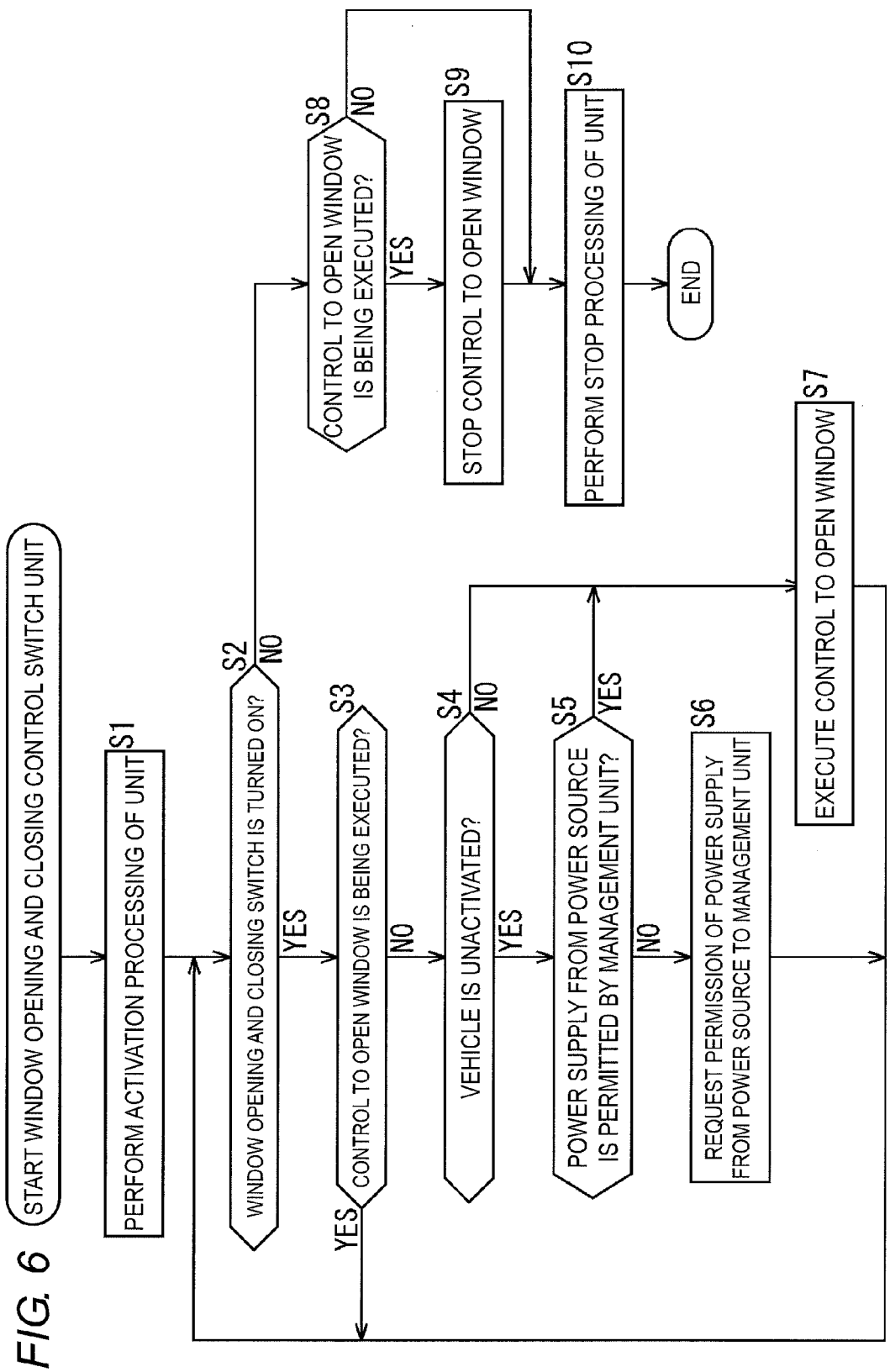
FIG. 6 is a flowchart for describing processing of the window opening and closing control switch unit.

First, referring to a flowchart in FIG. 6, processing of the window opening and closing control switch unit 26 will be described. More specifically, processing when the power window motor 27 is controlled by the window opening and closing control switch unit 26 to open the window will be described.

This processing is started, for example, when the window opening and closing switch 81 is turned on (more strictly, when the window opening and closing switch 81 is turned on in a direction at which the window is opened.

In step S1, the window opening and closing control switch unit 26 performs activation processing of the unit. Specifically, as described above with reference to FIG. 2, by turning on the window opening and closing switch 81, the MOSFET 261*b* of the power source supply circuit 204*b* is turned on, and the supply of the power from the battery 21 to the window opening and closing control circuit 91 through the power source supply circuit 204*b* is started. The respective units of the window opening and closing control circuit 91 except for the opening and closing control unit 433 are activated.

Moreover, by turning on the window opening and closing switch 81, a signal indicating that the window opening and closing switch 81 is turned on is notified from the switch input circuit 207*b* to the operation signal detecting unit 431 of the window opening and closing control circuit 91.

Furthermore, the power input control unit 434 of the window opening and closing control circuit 91 turns on the transistor 271*b* of the power source supply holding circuit 205*b*, based on the control of the power source control unit 432. This maintains ON of the MOSFET 261*b* of the power source supply circuit 204*b* regardless of the state of the window opening and closing switch 81, so that the supply of the power to the window opening and closing control circuit 91 is continued.

Moreover, the power source control unit 432 starts the supply of the power to the communication circuit 92.

In step S2, the power source control unit 432 determines whether or not the window opening and closing switch 81 is turned on, based on the signal of the operation state detected by the operation signal detecting unit 431. The power source control unit 432, having determined that the window opening and closing switch 81 is turned on, notifies the opening and closing control unit 433 that the window opening and closing switch 81 is turned on.

Thereafter, the processing goes to step S3.

In step S3, the power source control unit 432 determines whether or not the control to open the window is being executed. If it is determined that the control to open the window is not being executed, the processing goes to step S4.

In step S4, the power source control unit 432 determines whether or not the vehicle is unactivated. If it is determined that the vehicle is unactivated, the processing goes to step S5. The activation state of the vehicle is stored, for example, in the storage unit 403 of the management unit 23. The power source control unit 432 receives the activation state of the vehicle through the communication circuit 92.

In step S5, the power source control unit 432 determines whether or not the power supply from the power source in accordance with the window opening and closing control has already been permitted by the management unit 23. If it is determined that the power supply from the power source has not been permitted by the management unit 23 yet, the processing goes to step S6.

In step S6, the power source control unit 432 transmits a power source supply permission request signal through the communication circuit 92 to thereby request the permission of the power supply from the power source to the management unit 23.

Thereafter, the processing returns to step S2, and until in step S2, it is determined that the window opening and closing switch 81 is turned on, or until in step S4, it is determined that the vehicle is activated, or until in step S5, it is determined that the power supply from the power source is permitted by the management unit 23, the series of processing in steps S2 to S6 is repeatedly executed.

Figure 8:
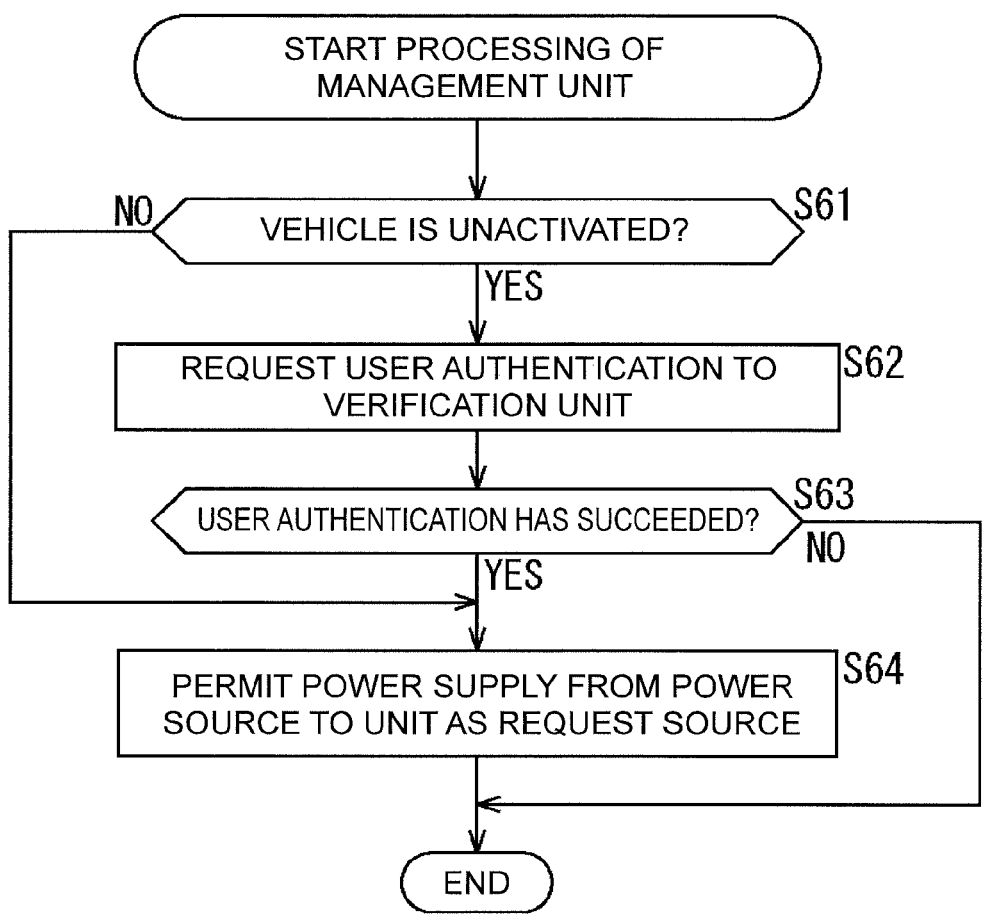
FIG. 8 is a flowchart for describing processing of the management unit.

If the user authentication by the verification unit 25 has succeeded in processing in FIG. 8 described later, the management unit 23, which has received the power source supply permission request signal from the window opening and closing control switch unit 26, transmits a power source supply permitting signal to notify the permission of the power supply from the power source to the window opening and closing control switch unit 26.

After the power source control unit 432 of the window opening and closing control circuit 91 has received the power source supply permitting signal transmitted from the management unit 23 through the communication circuit 92, in step S5, it is determined that the power supply from the power source is permitted by the management unit 23, and the processing goes to step S7.

Moreover, in step S4, if it is determined that the vehicle is activated, the processing goes to step S7 regardless of whether or not the power supply from the power source is permitted by the management unit 23.

That is, as described above, even if the vehicle activation switch 31 is operated, the vehicle cannot be activated unless the user authentication has succeeded. If the vehicle activation switch 31 is operated and the vehicle is activated, the user authentication has already succeeded, and thus, the power supply from the power source is considered to have been permitted though the permission is not confirmed with the management unit 23.

In step S7, the window opening and closing control circuit 91 executes the control to open the window. Specifically, the power source control unit 432 supplies the power to the opening and closing control unit 433. The opening and closing control unit 433 controls the power window motor 27, based on the position of the window detected by the window position sensor 28 and the like to start the control to open the window.

Thereafter, the processing returns to step S2, and in step S2, it is determined that the window opening and closing switch 81 is off, or until the opening of the window is finished, the processing in steps S2 and S3 is executed repeatedly.

On the other hand, in step S2, if the power source control unit 432 determines that the window opening and closing switch 81 is turned off through the operation signal detecting unit 431, the power source control unit 432 notifies the opening and closing control unit 433 that the window opening and closing switch 81 is turned off. Thereafter, the processing goes to step S8.

In step S8, similarly to the processing in step S3, whether or not the control to open the window is being executed is determined. If it is determined that the control to open the window is being executed, the processing goes to step S9.

In step S9, the window opening and closing control circuit 91 stops the control to open the window. Specifically, the opening and closing control unit 433 stops the supply of the power to the power window motor 27. Moreover, the power source control unit 432 stops the supply of the power to the opening and closing control unit 433.

Thereafter, the processing goes to step S10.

On the other hand, in step S8, if it is determined that the control to open the window is not being executed, the processing in step S9 is skipped to go to step S10.

This is a case where the window is not opened because the user authentication has not succeeded in a period from ON to OFF of the window opening and closing switch 81, so that the power supply from the power source is not permitted by the management unit 23.

In step S10, the window opening and closing control switch unit 26 performs stop processing of the unit. Specifically, as described above with reference to FIG. 2, the power input control unit 434 controls the self-holding off circuit 206*b* and the power source supply holding circuit 205*b*, based on the control of the power source control unit 432 to turn off the MOSFET 261*b* of the power source supply circuit 204*b*. This stops the supply of the power from the battery 21 to the window opening and closing control circuit 91 through the power source supply circuit 204*b*, so that the operation of the window opening and closing control circuit 91 stops, and the processing of the window opening and closing control switch unit 26 ends.

[Processing of Radio Unit 29]

Figure 7:
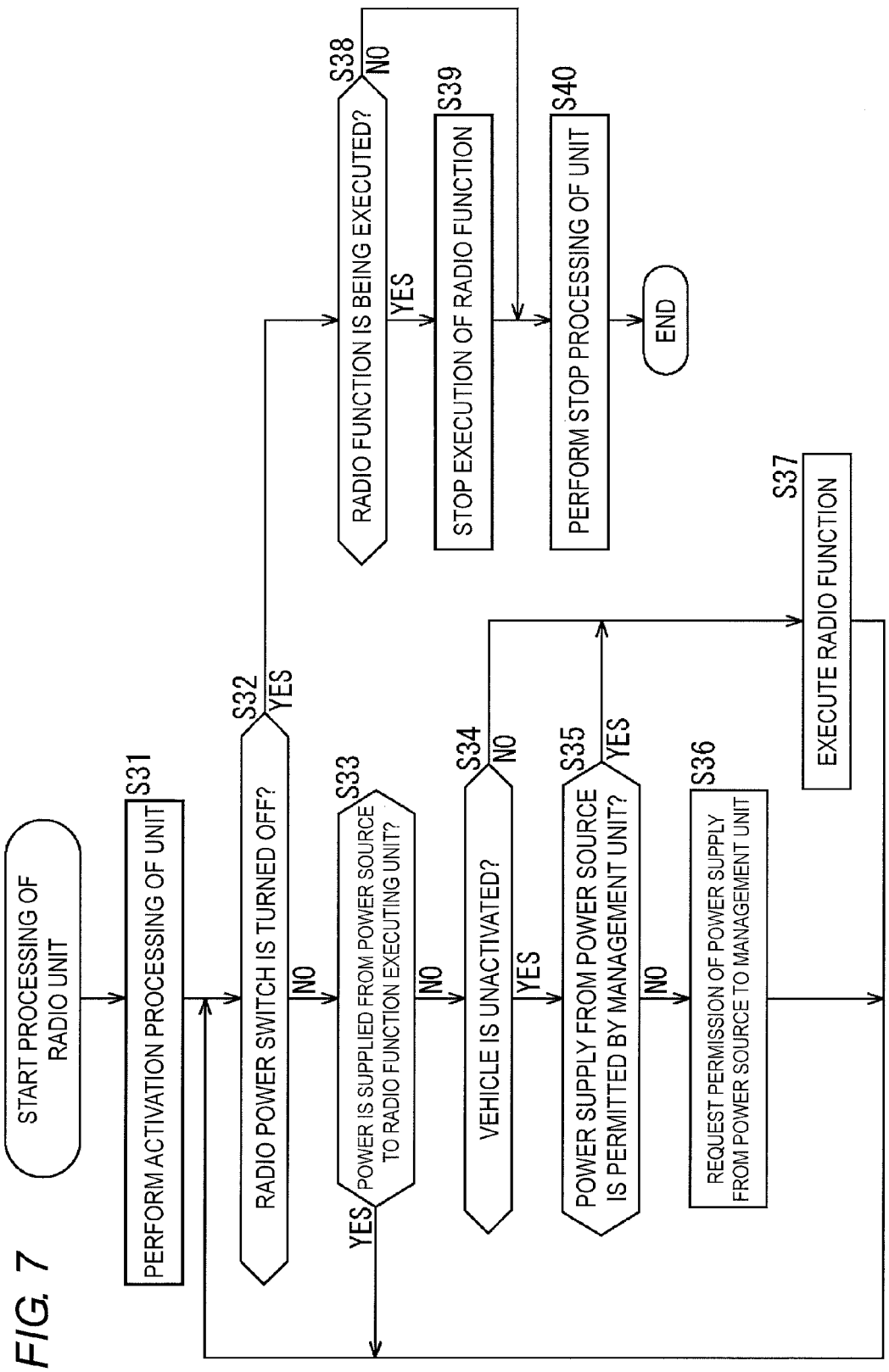
FIG. 7 is a flowchart for describing processing of a radio unit.

Next, referring to a flowchart in FIG. 7, the processing of the radio unit 29 will be described.

This processing is started, for example, when the radio power switch 111 is turned on.

In step S31, the radio unit 29 performs activation processing of the unit. Specifically, as described above with reference to FIG. 2, by turning on the radio power switch 111, the MOSFET 261*c* of the power source supply circuit 204*c* is turned on, and the supply of the power from the battery 21 to the radio control circuit 121 is started through the power source supply circuit 204*c*. The respective units of the radio control circuit 121 except for the radio function executing unit 453 are activated.

Moreover, by turning on the radio power switch 111, a signal indicating that the radio power switch 111 is turned on is notified from the switch input circuit 207*c* to the operation signal detecting unit 451 of the radio control circuit 121.

Furthermore, the power input control unit 454 of the radio control circuit 121 turns on the transistor 271*c* of the power source supply holding circuit 205*c*, based on the control of the power source control unit 452. This maintains ON of the MOSFET 261*c* of the power source supply circuit 204*c* regardless of the state of the radio power switch 111, so that the supply of the power to the radio control circuit 121 is continued.

Moreover, the power source control unit 452 starts the supply of the power to the communication circuit 122.

In step S32, the power source control unit 452 determines whether or not the radio power switch 111 is turned off, based on the signal notified from the switch input circuit 207c through the operation signal detecting unit 451. If it is determined that the radio power switch 111 is not turned off, the processing goes to step S33.

In step S33, the power source control unit 452 determines whether or not the power is being supplied to the radio function executing unit 453. If it is determined that the power supply from the power source is not being supplied to the radio function executing unit 453, the processing goes to step S34.

In step S34, the power source control unit 452 determines whether or not the vehicle is unactivated. If it is determined that the vehicle is unactivated, the processing goes to step S35. The activation state of the vehicle is stored, for example, in the storage unit 403 of the management unit 23. The power source control unit 452 receives the activation state of the vehicle through the communication circuit 122.

In step S35, the power source control unit 452 determines whether or not the power supply from the power source has already been permitted by the management unit 23. If it is determined that the power supply from the power source has not been permitted by the management unit 23 yet, then the processing goes to step S36.

In step S36, the power source control unit 452 transmits the power source supply permission request signal through the communication circuit 122 to thereby request the permission of the power supply from the power source to the management unit 23.

Thereafter, the processing returns to step S32, and until in step S32, it is determined that the radio power switch 111 is turned off, until in step S34, it is determined that the vehicle is activated, or until in step S35, it is determined that the power supply from the power source is permitted by the management unit 23, the series of processing in steps S32 to S36 is repeatedly executed.

If the user authentication by the verification unit 25 has succeeded in processing in FIG. 8 described later, the management unit 23, which has received the power source supply permission request signal from the radio unit 29, transmits the power source supply permitting signal to notify the permission of the power supply to the radio unit 29.

After the power source control unit 452 of the radio control circuit 121 has received the power source supply permitting signal transmitted from the management unit 23 through the communication circuit 122, in step S35, it is determined that the power supply from the power source is permitted by the management unit 23, and the processing goes to step S37.

Moreover, in step S34, if it is determined that the vehicle is activated, the processing goes to step S37 regardless of whether or not the power supply from the power source is permitted by the management unit 23.

As described above, even if the vehicle activation switch 31 is operated, the vehicle cannot be activated unless the user authentication has succeeded. If the vehicle activation switch 31 is operated and the vehicle is activated, the user authentication has already succeeded, and thus, the power supply from the power source is considered to have been permitted even though the permission is not confirmed with the management unit 23.

In step S37, the radio unit 29 executes the radio function. Specifically, the power source control unit 452 supplies the power to the radio function executing unit 453. The radio function executing unit 453 starts the reception of the radio wave from the radio station to supply the audio signal based on the received radio wave to the speaker 30 and cause the sounds to be outputted from the speaker 30.

Thereafter, the processing returns to step S32, and until in step S32, it is determined that the radio power switch 111 is turned off, the series of processing in steps S32 and S33 is repeatedly executed.

On the other hand, in step S32, if it is determined that the radio power switch 111 is turned off, the operation signal detecting unit 451 notifies the power source control unit 452 and the radio function executing unit 453 that the radio power switch 111 is turned off.

Thereafter, the processing goes to step S38.

In step S38, the power source control unit 452 determines whether or not the radio function is being executed. If it is determined that the radio function is being executed, the processing goes to step S39.

In step S39, the radio unit 29 stops the execution of the radio function. Specifically, the power source control unit 452 stops the supply of the power to the radio function executing unit 453. This stops the operation of the radio function executing unit 453.

Thereafter, the processing goes to step S40.

On the other hand, in step S39, if it is determined that the radio function is not being executed, the processing in step S39 is skipped to go to step S40.

In step S40, the radio unit 29 performs the stop processing of the unit. Specifically, as described above with reference to FIG. 2, the power input control unit 454 controls the self-holding off circuit 206c and the power source supply holding circuit 205c, based on the control of the power source control unit 452 to turn off the MOSFET 261c of the power source supply circuit 204c. This stops the supply of the power from the battery 21 to the radio control circuit 121 through the power source supply circuit 204c, so that the operation of the radio control circuit 121 stops, and the processing of the radio unit 29 ends.

[Processing of Management Unit 23]

Next, referring to a flowchart in FIG. 8, processing of the management unit 23 executed corresponding to the processing of the window opening and closing control switch unit 26 in FIG. 6, or the processing of the radio unit 29 in FIG. 7 will be described.

This processing is started when the control unit 402 of the management unit 23 receives the power source supply permission request signal transmitted from the window opening and closing control switch unit 26 or the radio unit 29 through the communication unit 401.

In step S61, the user authentication confirming unit 411 determines whether or not the vehicle is unactivated, based on the activation state of the vehicle stored in the storage unit 403. If it is determined that the vehicle is unactivated, the processing goes to step S62.

In step S62, the user authentication confirming unit 411 requests the user authentication to the verification unit 25 by transmitting a user authentication request signal that requests the user authentication through the communication unit 401.

Figure 9:
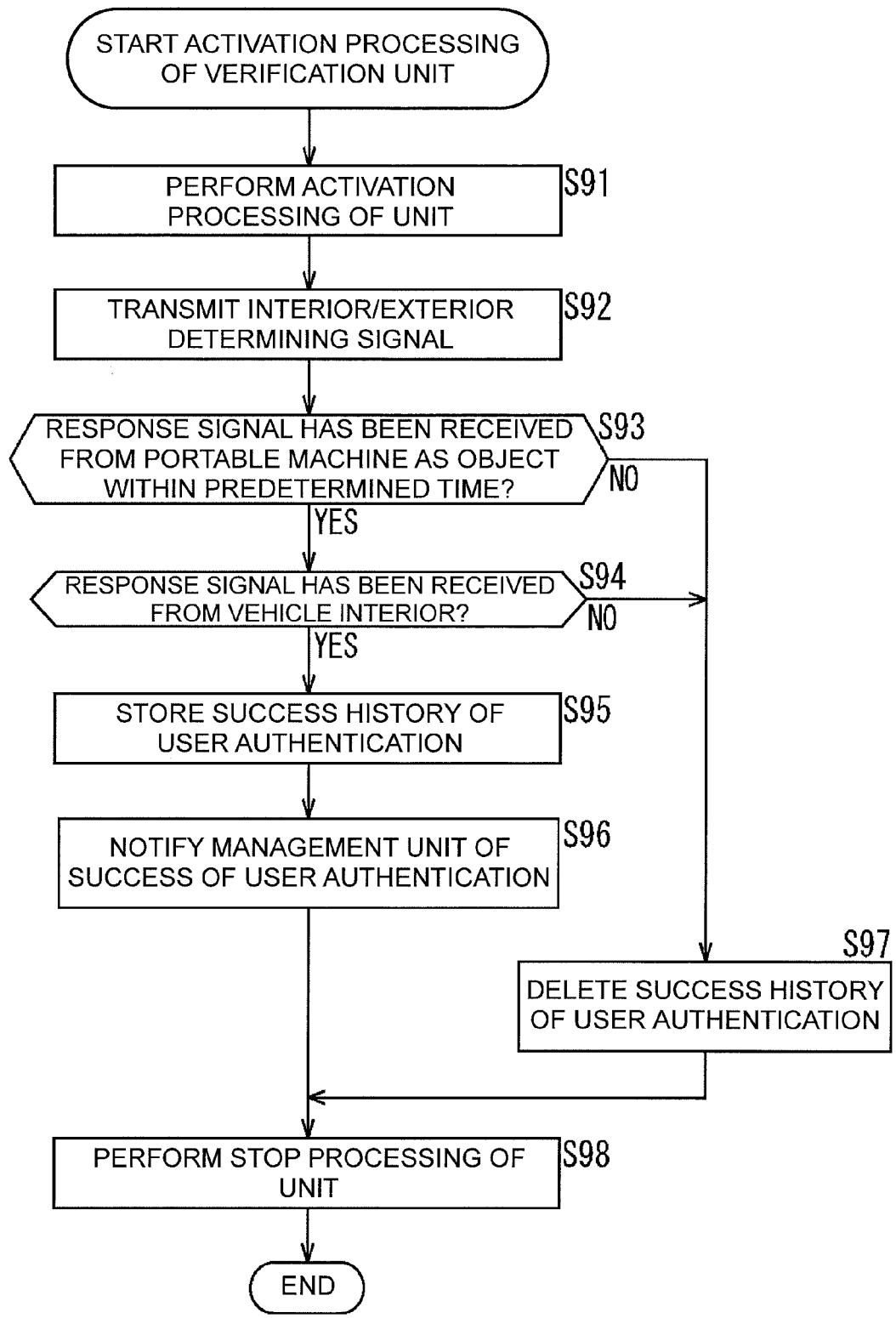
FIG. 9 is a flowchart for describing activation processing of a verification unit.

The verification unit 25 executes the user authentication by the processing in FIG. 9 described later, and if the user authentication has succeeded, the verification unit 25 transmits, to the management unit 23, a user authentication success signal notifying the success of the user authentication.

In step S63, the user authentication confirming unit 411 determines whether or not the user authentication has succeeded. If receiving the user authentication success signal from the verification unit 25 through the communication unit 401 within a predetermined time from the transmission of the user authentication request signal, the user authentication confirming unit 411 determines that the user authentication has succeeded, and notifies the in-vehicle instrument control unit 412 that the user authentication has succeeded.

Thereafter, the processing goes to step S64.

On the other hand, in step S61, if it is determined that the vehicle is activated, the user authentication confirming unit 411 notifies the in-vehicle instrument control unit 412 that the user authentication has already succeeded. That is, as described above, because the vehicle cannot be activated unless the user authentication has succeeded, the user authentication is considered to have already succeeded if the vehicle is in an activated state, that is, if the information indicating that the vehicle is activated is stored in the storage unit 403 of the management unit 23.

Thereafter, the processing in steps S62 and S63 is skipped to go to step S64.

In step S64, the in-vehicle instrument control unit 412 transmits the power source supply permitting signal through the communication unit 401 to thereby permit the power supply from the power source to the unit as the request source (the window opening and closing control switch unit 26 or the radio unit 29).

Thereafter, the processing of the management unit 23 ends.

On the other hand, in step S63, if the user authentication confirming unit 411 does not receive the user authentication success signal from the verification unit 25 within the predetermined time from the transmission of the user authentication request signal, the user authentication confirming unit 411 determines that the user authentication has failed, and notifies the in-vehicle instrument control unit 412 that the user authentication has failed.

Thereafter, the processing of the management unit 23 ends.

That is, in this case, nothing is transmitted from the management unit 23.

[Processing of Verification Unit 25]

Next, referring to a flowchart in FIG. 9, processing executed by the verification unit 25 corresponding to the processing of the management unit 23 in FIG. 8 will be described.

This processing is started when the verification executing circuit 61 of the verification unit 25 receives, through the communication unit 63, the user authentication request signal transmitted by the management unit 23.

In step S91, the verification unit 25 performs activation processing of the unit. Specifically, the user authentication request signal from the management unit 23 is inputted to the trigger circuit 202a of the power source control circuit 51a and the transistor 231a of the trigger circuit 202a is turned on, by which as described above with reference to FIG. 2, the supply of the power to the verification executing circuit 61 from the battery 21 is started through the power source supply circuit 204a. The verification executing circuit 61 is then activated.

Moreover, the verification executing circuit 61 turns on the transistor 271a of the power source supply holding circuit 205a. This maintains ON of the MOSFET 261a of the power source supply circuit 204a, so that the supply of the power to the verification executing circuit 61 is continued.

In step S92, the verification executing circuit 61 transmits an interior/exterior determining signal from the respective antennas 53.

In step S93, the verification executing circuit 61 determines whether or not a response signal has been received from the portable machine 12 as an object within a predetermined time.

Specifically, if the portable machine 12 exists within a communication area of any one of the antennas 53, and has received the interior/exterior determining signal transmitted from the relevant antenna 53, the portable machine 12 transmits the response signal including an identification number of its own.

If the verification executing circuit 61 receives the response signal from the portable machine 12 through the antenna 53 within the predetermined time from the start of the transmission of the interior/exterior determining signal, the verification executing circuit 61 compares the identification number included in the received response signal with the identification number stored in advance. If the identification numbers are matched, the verification executing circuit 61 determines that the response signal has been received from the portable machine 12 as the object, and the processing goes to step S94.

In step S94, the verification executing circuit 61 determines whether or not the response signal has been received from the vehicle interior. If the response signal has been received from the portable machine 12 through the antenna 53 whose communication area is set in the vehicle interior, the verification executing circuit 61 determines that it has received the response signal from the vehicle interior, and the processing goes to step S95.

In step S95, the verification executing circuit 61 stores a success history of the user authentication in the storage unit 62.

In step S96, the verification executing circuit 61 transmits the user authentication success signal notifying the success of the user authentication through the communication unit 63 to thereby notify the management unit 23 of the success of the user authentication.

That is, if the portable machine 12 having the identification number matching the identification number registered in advance exists within the communication area in the vehicle interior of each of the antennas 53, the user authentication has succeeded, and the management unit 23 is notified of the success of the user authentication.

Thereafter, the processing goes to step S98.

On the other hand, in step S94, if the verification unit 25 receives the response signal from the portable machine 12 through the antenna 53 whose communication area is set in the vehicle exterior, the verification unit 25 determines that the response signal has been received from the vehicle exterior, and the processing goes to step S97.

Moreover, in step S93, if the verification unit 25 cannot receive the response signal from the portable machine 12 within the predetermined time from the start of the transmission of the interior/exterior determining signal, or if the identification number included in the response signal received from the portable machine 12 does not match the identification number stored in advance, the verification unit 25 determines that the response signal has not been received from the portable machine 12 as the object within the predetermined time, and the processing goes to step S97.

In step S97, the verification executing circuit 61 deletes the success history of the user authentication from the storage circuit 62.

That is, if the portable machine 12 having the identification number matching the identification number registered in advance does not exist within the communication area in the vehicle interior of each of the antennas 53, the user authentication will fail. In this case, the management unit 23 is not notified of the failure of the user authentication.

Thereafter, the processing goes to step S98.

In step S98, the verification unit 25 performs stop processing of the unit. Specifically, as described above with reference to FIG. 2, the verification executing circuit 61 controls the self-holding off circuit 206a and the power source supply holding circuit 205a to turn off the MOSFET 261a of the power source supply circuit 204a. This stops the supply of the power from the battery 21 to the verification executing circuit 61 through the power source supply circuit 204a, so that the operation of the verification executing circuit 61 stops, and the processing of the verification unit 25 ends.

As described above, even when the vehicle is not activated by the operation of the vehicle activation switch 31, operating the window opening and closing switch 81 can activate only the window opening and closing control switch unit 26 to open and close the window. When the opening and closing of the window is not performed, the inside of the window opening and closing control switch unit 26 is not supplied with the power, and therefore, the power consumption (standby electricity) when the window opening and closing control switch unit 26 is not used can be reduced.

Similarly, even when the vehicle is not activated by the operation of the vehicle activation switch 31, operating the radio power switch 111 can activate only the radio unit 29 to execute the radio function, thereby enabling the user to listen to the radio. Moreover, because the inside of the radio unit 29 is not supplied with the power when the radio unit 29 is not operated, the power consumption (standby electricity) when the radio unit 29 is not used can be reduced.

Moreover, when the vehicle activation switch 31 is set to OFF, the window opening and closing control switch unit 26 and the radio unit 29 are not operated unless the user authentication by the portable machine 12 succeeds, which can prevent a person other than the predetermined user from using the respective units without permission. Also, because the respective units are not operated unless the user authentication succeeds, the power consumption of the in-vehicle instruments that are not used can be reduced.

Furthermore, when the vehicle activation switch 31 is set to OFF, the user authentication is executed without fail to permit the power supply from the power source to the window opening and closing control switch unit 26 and the radio unit 29, which enables the power supply from the power source to the one unit to be prohibited during the operation of the other unit. Specifically, for example, if the portable machine 12 is brought outside the vehicle during the operation of the window opening and closing control switch unit 26, and the user authentication is disabled, the power supply from the power source to the radio unit 29 can be prohibited while continuing the operation of the window opening and closing control switch unit 26.

Hereafter, modifications of one or more embodiments of the present invention will be described.

[Modification 1]

For example, other in-vehicle instruments are configured similarly to the window opening and closing control switch unit 26 and the radio unit 29, by which when the vehicle is not activated by the operation of the vehicle activation switch 31, the respective in-vehicle instruments can be individually used by operating the operation units of the switches or the like, and performing the user authentication. The power consumption (standby electricity) of the in-vehicle instruments that are not used can be reduced.

[Modification 2]

Moreover, for example, the window opening and closing control switch unit 26 and the radio unit 29 may directly confirm the result of the user authentication with the verification unit 25 without the management unit 23 intervening, and if the user authentication has succeeded, the power may be supplied from the power source.

[Modification 3]

Furthermore, in the foregoing, in the window opening and closing control switch unit 26 and the radio unit 29, the user authentication result may be stored, so that the stored user authentication result may be confirmed.

Moreover, the operation result of the vehicle activation switch 31 may be stored in the window opening and closing control switch unit 26 and the radio unit 29.

[Modification 4]

Moreover, if the user authentication has not succeeded, the failure of the user authentication may be notified from the verification unit 25 to the management unit 23. Furthermore, if the user authentication has failed, a power source supply prohibiting signal to notify the prohibition of the power supply from the power source may be transmitted from the management unit 23 to the unit as the request source. The unit, which has received the power source supply prohibiting signal, may control the power source control circuit 51 to stop the supply of the power to an inside of the unit.

[Modification 5]

Furthermore, for example, when the respective units are operated in the OFF state of the vehicle activation switch 31, the verification unit 25 may periodically execute the user authentication, and if the user authentication has failed, the operation of the unit being operated may be stopped.

[Modification 6]

Moreover, the power source that supplies the power to the respective units is not limited to the battery, but embodiments of the present invention can be applied to a case where a power source other than the battery is used.

[Modification 7]

The vehicle activation switch 31 may be connected only to the management unit 23 without being connected to the verification unit 25 and the like. In this case, the result from operating the vehicle activation switch 31 is notified only to the management unit 23, and an operation result thereof is stored in the storage unit 403 of the management unit 23.

[Modification 8]

Operation means for operating the respective units is not limited to the above-described switches, but arbitrary operation means such as, for example, buttons, keys, a touch panel, and the like can be employed.

The above-described series of processing can be executed by hardware, or by software. If the above-described series of processing is executed by the software, a program configuring the software is installed on a computer. The computer includes a computer in which the control unit 402 of the management unit 23, the verification executing circuit 61, the window opening and closing control circuit 91, the radio control circuit 121, and the like are incorporated in dedicated hardware, and, for example, a general-purpose computer in which various functions can be executed by installing various programs, and the like.

The program executed by the computer may be a program that performs the series of processing chronologically along the order described in the present specification, or may be a program that performs the series of processing in parallel, or at necessary timing such as when calling is performed and the like.

Moreover, in the present specification, a term "system" means an overall device made up of a plurality of devices, means, and the like.

Furthermore, embodiments of the present invention are not limited to the above-described embodiment, but various modifications can be made. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An in-vehicle instrument control device that is provided for each of a plurality of in-vehicle instruments operated by power from a power source provided in a vehicle, and that controls supply of the power to the corresponding in-vehicle instrument, the device comprising:
   an operation unit that operates the in-vehicle instrument;
   a communication unit that communicates with a user authentication unit to obtain a user authentication result;
   an in-vehicle instrument control unit that determines whether or not power supply from the power source to the in-vehicle instrument is permitted, based on activation state information of the vehicle and the user authentication result obtained through the communication unit; and
   a power source control unit that is provided between the operation unit and the power source control unit,
   wherein the power source control unit comprises:
      a power source supply circuit that starts the supply of the power from the power source to the in-vehicle instrument control unit when a predetermined operation signal is inputted from the operation unit; and
      an activation self-holding circuit that continues the supply of the power to the in-vehicle instrument control unit by the power source supply circuit even when operation of the operation unit causing the predetermined operation is completed,
   wherein when the power source control unit starts the supply of the power from the power source to the in-vehicle instrument control unit, the in-vehicle instrument control unit determines whether or not the power supply is permitted,
   wherein when the vehicle is activated, the in-vehicle instrument control unit permits the supply of the power, thereby supply the power from the power source to the in-vehicle instrument,
   wherein when the vehicle is not activated and the user authentication result indicates that the user authentication has succeeded, the in-vehicle instrument control unit permits the supply of the power, thereby supplying the power from the power source to the in-vehicle instrument, and
   wherein when the vehicle is not activated and the user authentication result indicates that the user authentication has not succeeded, the in-vehicle instrument control unit does not permit the supply of the power.

2. The in-vehicle instrument control device according to claim 1, wherein after the supply of the power to the in-vehicle instrument is started, the power source control unit stops the supply of the power to the in-vehicle instrument, based on the control of the in-vehicle instrument.

* * * * *